United States Patent
Mercx et al.

(10) Patent No.: US 10,288,783 B2
(45) Date of Patent: May 14, 2019

(54) REFLECTIVE ARTICLES COMPRISING A MICRO-CELLULAR STRUCTURE AND HAVING IMPROVED REFLECTIVITY

(71) Applicant: SABIC Global Technologies B.V., Bergen op Zoom (NL)

(72) Inventors: Franciscus Petrus Maria Mercx, Bergen op Zoom (NL); Muhammad Jameel Aslam, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/558,754

(22) PCT Filed: Mar. 15, 2016

(86) PCT No.: PCT/IB2016/051460
§ 371 (c)(1),
(2) Date: Sep. 15, 2017

(87) PCT Pub. No.: WO2016/151430
PCT Pub. Date: Sep. 29, 2016

(65) Prior Publication Data
US 2018/0067239 A1    Mar. 8, 2018

Related U.S. Application Data

(60) Provisional application No. 62/135,848, filed on Mar. 20, 2015.

(51) Int. Cl.
*G02B 5/08* (2006.01)
*G02B 19/00* (2006.01)
*B29D 11/00* (2006.01)
*F21V 7/22* (2018.01)
*B29L 11/00* (2006.01)

(52) U.S. Cl.
CPC ...... *G02B 5/0891* (2013.01); *B29D 11/00605* (2013.01); *F21V 7/22* (2013.01); *G02B 19/0019* (2013.01); *G02B 19/0061* (2013.01); *B29L 2011/0083* (2013.01)

(58) Field of Classification Search
CPC .... G02B 5/0891; G02B 5/08; G02B 19/0019; G02B 19/0061; B29D 11/00605; F21V 7/22; B29L 2011/0083
USPC ........................................................ 359/350
See application file for complete search history.

(56) References Cited

U.S. PATENT DOCUMENTS

| | | | |
|---|---|---|---|
| 7,643,104 B2 * | 1/2010 | Komatsubara | G02B 5/0247 349/112 |
| 8,629,192 B2 * | 1/2014 | Merrigan | B29C 33/68 427/243 |
| 2006/0210785 A1 | 9/2006 | Takada et al. | |
| 2010/0119812 A1 | 5/2010 | Fujii et al. | |

(Continued)

FOREIGN PATENT DOCUMENTS

DE    102013010604 A1    12/2014

OTHER PUBLICATIONS

International Patent Application No. PCT/IB2016/051460; Int'l Preliminary Report on Patentability; dated Oct. 5, 2017; 7 pages.

*Primary Examiner* — William R Alexander
(74) *Attorney, Agent, or Firm* — Baker Hostetler LLP

(57) ABSTRACT

Provided are microcellular plastic articles having improved reflective properties. Also provided are methods of utilizing the disclosed articles.

19 Claims, 2 Drawing Sheets

| Sample | Material | Nucleant | Mold Temp (°C) | Delay (s) | GCP | Density (g/cm³) | Reflectivity 315-400 nm | Reflectivity 380-420 nm | Reflectivity 400-700 nm | Ratio refl (380-420nm)/refl (400-700 nm) | Ratio refl (315-400 nm)/refl (400-700 nm) |
|---|---|---|---|---|---|---|---|---|---|---|---|
| 1 | PC1 | None | 170 | 6 s | No | 0.419 | 55.8 | 79.9 | 87.6 | 0.91 | 0.64 |
| 2 | PC1 | None | 170 | 6 s | Yes | 0.479 | 77.6 | 90.9 | 96.4 | 0.94 | 0.80 |
| 3 | PC2 | 0.5 % Silica | 165 | 6 s | No | 0.559 | 65.4 | 86.1 | 94.3 | 0.91 | 0.69 |
| 4 | PC2 | 0.5 % Silica | 165 | 6 s | Yes | 0.427 | 81.4 | 91.1 | 95.7 | 0.95 | 0.85 |
| 5 | PC2 | 0.5 % Silica | 165 | 4 s | Yes | 0.385 | 79.6 | 90.0 | 94.6 | 0.95 | 0.84 |
| 6 | PC2 | 0.5 % Silica | 165 | 2 s | Yes | 0.380 | 81.0 | 90.7 | 95.1 | 0.95 | 0.85 |
| 7 | PC2 | 0.5 % Silica | 175 | 2 s | Yes | 0.340 | 77.1 | 88.3 | 93.7 | 0.94 | 0.82 |
| 8 | PC2 | 0.5 % Silica | 175 | 4 s | Yes | 0.439 | 82.4 | 90.5 | 94.6 | 0.96 | 0.97 |
| 9 | PC2 | 0.5 % Silica | 175 | 6 s | Yes | 0.362 | 80.0 | 89.8 | 95.0 | 0.95 | 0.84 |
| 10 | PC3 | 0.5 % Talc | 130 | None | No | 1.197 | 7.7 | 9.3 | 9.5 | 0.98 | 0.81 |
| 11 | PC3 | 0.5 % Talc | 165 | 6 s | No | 0.529 | 47.5 | 70.9 | 86.4 | 0.82 | 0.55 |
| 12 | PC3 | 0.5 % Talc | 165 | 6 s | Yes | 0.429 | 73.2 | 84.8 | 92.4 | 0.92 | 0.79 |
| 13 | PC3 | 0.5 % Talc | 165 | 2 s | Yes | 0.387 | 63.8 | 78.1 | 87.5 | 0.89 | 0.73 |
| 14 | PC3 | 0.5 % Talc | 175 | 2 s | Yes | 0.409 | 68.5 | 82.5 | 89.3 | 0.92 | 0.77 |

(56) References Cited

U.S. PATENT DOCUMENTS

| | | | |
|---|---|---|---|
| 2012/0043552 A1 | 2/2012 | David et al. | |
| 2012/0080089 A1* | 4/2012 | Aoyama | C08J 5/18 |
| | | | 136/256 |
| 2012/0154917 A1 | 6/2012 | Teather | |
| 2015/0023054 A1* | 1/2015 | Goda | B32B 7/12 |
| | | | 362/607 |
| 2015/0167909 A1* | 6/2015 | Katona | F21K 9/56 |
| | | | 362/84 |
| 2015/0233536 A1* | 8/2015 | Krames | F21K 9/56 |
| | | | 362/84 |
| 2018/0067240 A1* | 3/2018 | Mercx | B29D 11/00605 |

* cited by examiner

| Sample | Material | Nucleant | Mold Temp (°C) | Delay (s) | GCP | Density (g/cm³) | Reflectivity | | | Ratio refl (380-420nm)/refl (400-700 nm) | Ratio refl (315-400 nm)/refl (400-700 nm) |
|---|---|---|---|---|---|---|---|---|---|---|---|
| | | | | | | | 315-400 nm | 380-420 nm | 400-700 nm | | |
| 1 | PC1 | None | 170 | 6 s | No | 0.419 | 55.8 | 79.9 | 87.6 | 0.91 | 0.64 |
| 2 | PC1 | None | 170 | 6 s | Yes | 0.479 | 77.6 | 90.9 | 96.4 | 0.94 | 0.80 |
| 3 | PC2 | 0.5 % Silica | 165 | 6 s | No | 0.559 | 65.4 | 86.1 | 94.3 | 0.91 | 0.69 |
| 4 | PC2 | 0.5 % Silica | 165 | 6 s | Yes | 0.427 | 81.4 | 91.1 | 95.7 | 0.95 | 0.85 |
| 5 | PC2 | 0.5 % Silica | 165 | 4 s | Yes | 0.385 | 79.6 | 90.0 | 94.6 | 0.95 | 0.84 |
| 6 | PC2 | 0.5 % Silica | 165 | 2 s | Yes | 0.380 | 81.0 | 90.7 | 95.1 | 0.95 | 0.85 |
| 7 | PC2 | 0.5 % Silica | 175 | 2 s | Yes | 0.340 | 77.1 | 88.3 | 93.7 | 0.94 | 0.82 |
| 8 | PC2 | 0.5 % Silica | 175 | 4 s | Yes | 0.439 | 82.4 | 90.5 | 94.6 | 0.96 | 0.97 |
| 9 | PC2 | 0.5 % Silica | 175 | 6 s | Yes | 0.362 | 80.0 | 89.8 | 95.0 | 0.95 | 0.84 |
| 10 | PC3 | 0.5 % Talc | 130 | None | No | 1.197 | 7.7 | 9.3 | 9.5 | 0.98 | 0.81 |
| 11 | PC3 | 0.5 % Talc | 165 | 6 s | No | 0.529 | 47.5 | 70.9 | 86.4 | 0.82 | 0.55 |
| 12 | PC3 | 0.5 % Talc | 165 | 6 s | Yes | 0.429 | 73.2 | 84.8 | 92.4 | 0.92 | 0.79 |
| 13 | PC3 | 0.5 % Talc | 165 | 2 s | Yes | 0.387 | 63.8 | 78.1 | 87.5 | 0.89 | 0.73 |
| 14 | PC3 | 0.5 % Talc | 175 | 2 s | Yes | 0.409 | 68.5 | 82.5 | 89.3 | 0.92 | 0.77 |

FIG. 1A

| Sample | Material | Nucleant | Mold Temp (°C) | Delay (s) | GCP | Density (g/cm³) | Reflectivity 315-400 nm | 380-420 nm | 400-700 nm | Ratio refl (380-420nm)/refl(400-700 nm) | Ratio refl (315-400 nm)/refl (400-700 nm) |
|---|---|---|---|---|---|---|---|---|---|---|---|
| 15 | PC3 | 0.5 % Talc | 175 | 6 s | Yes | 0.526 | 66.1 | 80.8 | 89.9 | 0.90 | 0.73 |
| 16 | PC4 | None (EXL) | 165 | 6 s | Yes | 0.416 | 62.7 | 85.6 | 92.9 | 0.92 | 0.68 |
| 17 | PC4 | None (EXL) | 175 | 6 s | Yes | 0.419 | 78.6 | 90.3 | 94.7 | 0.95 | 0.83 |
| C1 | PC | | | | | 1.340 | 13.4 | 48.2 | 96.5 | 0.50 | 0.14 |
| C2 | PBT | | | | | 1.510 | 14.1 | 47.3 | 90.2 | 0.52 | 0.16 |
| C3 | Poly-amide | | | | | 1.740 | 13.6 | 48.7 | 91.7 | 0.53 | 0.15 |
| Comparative Samples | | | | | | | | | | | |
| Sample 1 | Polyester | | | | | | 79.4 | 94.6 | 98.7 | 0.96 | 0.80 |
| Sample 2 | Polyester | | | | | | 88.3 | 97.3 | 99.0 | 0.98 | 0.89 |
| Sample 3 | Polyester (improved drawability) | | | | | | 26.1 | 73.9 | 97.6 | 0.76 | 0.27 |
| Sample 4 | Polyester | | | | | | 86.0 | 96.3 | 98.5 | 0.98 | 0.87 |
| Sample 5 | Poly-carbonate | | | | | | 21.9 | 72.4 | 97.6 | 0.74 | 0.22 |

Fig. 1B

REFLECTIVE ARTICLES COMPRISING A MICRO-CELLULAR STRUCTURE AND HAVING IMPROVED REFLECTIVITY

CROSS-REFERENCE TO RELATED APPLICATIONS

This application is the National Stage of International Application No. PCT/IB2016/051460, filed Mar. 15, 2016, which claims the benefit of U.S. Provisional Application No. 62/135,848, filed Mar. 20, 2015, the disclosures of which are incorporated herein by reference in their entireties.

RELATED APPLICATION

The present application claims priority to and the benefit of U.S. application 62/135,848, "Reflective Articles Comprising a Micro-Cellular Structure And Having Improve Reflectivity" (filed Mar. 20, 2015), the entirety of which application is incorporated herein by reference for any and all purposes.

TECHNICAL FIELD

The present disclosure relates to the field of reflective polymeric materials.

BACKGROUND

Because of their performance and efficiency, violet (including violet-pumped) LEDs are replacing incandescent and halogen light sources.

Existing reflectors (for commercial and residential lighting) are made from polycarbonate or polyesters highly loaded with titanium dioxide or other whitening agents. Materials in existing reflectors, however, absorb significantly at wavelengths below 430 nm, thus typically in the violet and ultra-violet part of the spectrum. Because of this absorption, using these reflectors with LEDs can in some cases be a suboptimal combination.

Effective performance is becoming more critical for better color rendering index (CRI) performance as shops and museums are expected to switch to violet-pumped LEDs, given the LEDs' higher CRI, which increased CRI makes colors appear more natural. Reflectors used in these lighting systems must thus be reflective in the violet part of the light spectrum.

Because existing reflectors do not exhibit optimal optical properties for violet-pumped LEDs, there is a long-felt need in the art for improved reflective materials.

SUMMARY

In meeting these long-felt needs, the present disclosure first provides articles, comprising: a thermoplastic region having a cellular structure comprising a plurality of cells, the plurality of cells having a number-average cross-sectional dimension in the range of from about (or from) 0.3 micrometers up to about (or to) 100 micrometers, the region of thermoplastic having a reflectivity of at least about (or of at least) 80% for illumination in the range of from about (or from) 380 nm to about (or up to) 420 nm.

The present disclosure also provides methods, the methods comprising illuminating an article according to the present disclosure.

The present disclosure also provides injection-molded articles, comprising a thermoplastic region having a cellular structure comprising a plurality of cells, the plurality of cells having a cross-sectional dimension in the range of from about (or from) 0.3 micrometers up to about (or up to) 100 micrometers, the region of thermoplastic having a reflectivity of at least about 80% for illumination in the range of from about 380 nm to about 420 nm.

The present disclosure also provides methods, the methods comprising illuminating an article according to the present disclosure.

The present disclosure further provides articles, the articles, comprising a thermoplastic region having a cellular structure comprising a plurality of cells, the plurality of cells having a number-average cross-sectional dimension in the range of from about (or from) 0.3 micrometers up to about (or up to) 100 micrometers, the region of thermoplastic having a reflectivity of at least about (or of at least) 80% for illumination in the range of from about (or from) 380 nm to about (or up to) 420 nm, the thermoplastic region further comprising an amount of siloxane of up to 20 wt % of the total weight of the thermoplastic region.

The present disclosure also provides methods, the methods comprising illuminating an article according to the present disclosure.

The present disclosure further provides methods of modifying illumination performance, comprising in an illumination device having a surface configured to reflect illumination, replacing or covering at least some of said surface with an article according to the present disclosure.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 1 provides illustrative data from exemplary embodiments of the disclosed technology.

DETAILED DESCRIPTION OF ILLUSTRATIVE EMBODIMENTS

The present invention can be understood more readily by reference to the following detailed description taken in connection with the accompanying FIGs. and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. Further, reference to values stated in ranges includes each and every value within that range. Any documents cited herein are incorporated herein by reference in their entireties for any and all purposes.

Terms

It is also to be understood that the terminology used herein is for the purpose of describing particular aspects only and is not intended to be limiting. As used in the specification and in the claims, the term "comprising" may also include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a virgin polycarbonate" includes mixtures of two or more virgin polycarbonates. Furthermore, for example, reference to a filler includes mixtures of fillers.

Ranges can be expressed herein as from one particular value, and/or to another particular value. When such a range is expressed, another aspect includes from the one particular value and/or to the other particular value. For example, a range of "1 to 10" includes all intermediate values, e.g., 3, 5.56, and 7.3. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed. Likewise, if "about 10" is disclosed, then 10 is also disclosed.

As used herein, the terms "about" and "at or about" mean that the amount or value in question can be the value designated some other value approximately or about the same. It is generally understood, as used herein, that it is the nominal value indicated +/−10% a variation unless otherwise indicated or inferred. For example, "about 10" encompasses the range from 9 to 11, including 10. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a recycled polycarbonate blend refers to an amount that is sufficient to achieve the desired improvement in the property modulated by the formulation component, e.g. splaying, under applicable test conditions and without adversely affecting other specified properties. The specific level in terms of wt % in a composition required as an effective amount will depend upon a variety of factors including the amount and type of recycled polycarbonate blend, amount and type of virgin polycarbonate polymer compositions, amount and type of impact modifier compositions, including virgin and recycled impact modifiers, and end use of the article made using the composition.

Disclosed are the components useful in preparing the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary.

For example, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight. Molecular weights, where given, are understood to be on a polystyrene basis.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "thermoplastic" as used herein is a plastic material—suitably a polymer—that becomes pliable or moldable above a specific temperature and solidifies upon cooling.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

Acrylonitrile-butadiene-styrene (ABS) polymers are derived from acrylonitrile, butadiene, and styrene monomers. ABS materials generally exhibit excellent impact resistance and toughness. In particular, ABS materials combine the strength and rigidity of the acrylonitrile and styrene polymers with the toughness of the polybutadiene rubber. However, when compared to blends of polycarbonate and ABS, neat acrylonitrile-butadiene-styrene is typically used for applications with less stringent mechanical properties, such as tensile, flexural, heat, and fatigue requirements.

Styrene acrylonitrile resin (SAN) is a copolymer plastic comprising styrene and acrylonitrile. The chains of the polymer comprise alternating repeat units of styrene and acrylonitrile.

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers known for optical clarity and enhanced impact strength, high heat resistance, and relative ductility at room temperature or below. Polycarbonate may refer to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates.

As used herein, the terms "PC—Si," "polycarbonate-siloxane copolymer," "poly(carbonate-siloxane) copolymer," and "polycarbonate-polysiloxane copolymer," which can be used interchangeably, refer to a copolymer comprising repeating carbonate and siloxane units. The terms are inclusive of block copolymers having polysiloxane and polycarbonate blocks.

As used herein, the terms "ABS" and "acrylonitrile-butadiene-styrene copolymer," which can be used interchangeably, refer to an acrylonitrile-butadiene-styrene polymer which can be an acrylonitrile-butadiene-styrene terpolymer or a blend of styrene-butadiene rubber and styrene-acrylonitrile copolymer.

As used herein, the term "impact modifier" refers to a component of the disclosed impact modified polycarbonate blend compositions wherein the impact modifier is a polymeric material effective in improving the impact properties of the disclosed impact modified polycarbonate blend compositions, e.g. the notched Izod impact strength of the composition. As used herein, an impact modifier can be a one or more polymers such as acrylonitrile butadiene styrene copolymer (ABS), methacrylate butadiene styrene copolymer (MBS), bulk polymerized ABS (BABS), and/or silicon-graft copolymers.

The term "PET" refers to poly(ethylene terephthalate). As used herein the terms "poly(ethylene terephthalate)" and "PET" include PET homopolymers PET copolymers and PETG. As used herein the term PET copolymer refers to PET that has been modified by up to 10 mole percent with one or more added comonomers. For example the term PET copolymer includes PET modified with up to 10 mole percent isophthalic acid on a 100 mole percent carboxylic acid basis. In another example the term PET copolymer includes PET modified with up to 10 mole percent 1,4 cyclohexane dimethanol (CHDM) on a 100 mole percent diol basis. As used herein the term PETG refers to PET modified with 10 to 50 percent CHDM on a 100 mole percent diol basis.

As used herein, the terms "ITR-PC," and (isophthalic acid-terephthalic acid-resorcinol)-bisphenol A copolyester-carbonate refer to copolyestercarbonates comprising a polycarbonate unit and a polyester unit, the polyester unit derived from the reaction of isophthalic acid, terephthalic acid, and a resorcinol moiety.

The term "talc" is used herein to mean a mineral composed of hydrated magnesium silicate. The term "surface treated talc" (or "surface modified talc" or "coated talc") is used herein to mean particles of talc, whose surface has been fully or partially, physically or chemically, modified using a surface treating agent. Such agents can be of organic or inorganic nature. These agents can include fatty acids, fatty acid esters, silicones, Teflon, silanes, silane coupling agents, metal salts of fatty acid, or polyethylene glycol.

As used herein the terms "weight percent," "wt %," "wt %," and "wt. %," which can be used interchangeably, indicate the percent by weight of a given component based on the total weight of the composition, unless otherwise specified. That is, unless otherwise specified, all weight percent values are based on the total weight of the composition. It should be understood that the sum of weight percent values for all components in a disclosed composition or formulation are equal to 100.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonates

As described herein, the disclosed articles may comprise a polycarbonate. Polycarbonates are known in the art, and are described in, e.g., PCT/US2013/035456, PCT/US2013/076798, WO2013067684, U.S. Pat. No. 8,426,532, and other sources. Polycarbonates include aromatic carbonate chain units include compositions having structural units of the formula (II):

(II)

in which the $R^1$ groups are aromatic, aliphatic or alicyclic radicals. Preferably, $R^1$ is an aromatic organic radical and, more preferably, a radical of the formula (III):

-A1-Y1-A2- (III)

wherein each of A1 and A2 is a monocyclic divalent aryl radical and Y1 is a bridging radical having zero, one, or two atoms which separate A1 from A2. In an exemplary embodiment, one or more atoms separate A1 from A2.

Polycarbonates can be produced by the Schotten-Bauman interfacial reaction of the carbonate precursor with dihydroxy compounds. Polycarbonates can be produced by the interfacial reaction polymer precursors such as dihydroxy compounds; melt-made PC is also considered suitable.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl)carbonate, and di(naphthyl)carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates, as well as blends of linear polycarbonate and a branched polycarbonate can also be used. The branched polycarbonates can be prepared by adding a branching agent during polymerization. Polycarbonate can be produced by a melt polycondensation reaction between a dihydroxy compound and a carbonic acid diester. Preferably, the number average molecular weight of the polycarbonate is about (or is) 3,000 to about (or to) 1,000,000 grams/mole (g/mole). Within this range, it is desirable to have a number average molecular weight of greater than or equal to about (or greater than or equal to) 10,000, preferably greater than or equal to about (or greater than or equal to) 20,000, and more preferably greater than or equal to about (or greater than or equal to) 25,000 g/mole. Also desirable is a number average molecular weight of less than or equal to about (or less than or equal to) 100,000, preferably less than or equal to about (or less than or equal to) 75,000, more preferably less than or equal to about (or less than or equal to) 50,000, and most preferably less than or equal to about (or less than or equal to) 35,000 g/mole.

Polycarbonate-Polysiloxane Block Copolymers

The disclosed thermoplastic compositions may comprise a polycarbonate-polysiloxane block copolymer component. As used herein, the term polycarbonate-polysiloxane copolymer is equivalent to polysiloxane-polycarbonate copolymer, polycarbonate-polysiloxane polymer, or polysiloxane-polycarbonate polymer.

A non-limiting example of a polycarbonate-siloxane copolymer includes transparent EXL™, available from SABIC Innovative Plastics. The transparent EXL from SABIC is a polycarbonate-polysiloxane (9030T) copolymer, having been tested commercially and found to have about 6 mole % siloxane, a Mw of about 23,000 Daltons (polystyrene basis). Another non-limiting example of a polycarbonate-siloxane copolymer includes opaque EXL, available from SABIC Innovative Plastics. The opaque EXL from SABIC is a polycarbonate-polysiloxane (9030P) copolymer, having been tested commercially and found to have about 20 mole % siloxane, a Mw of about (or of) 29,900 Daltons (polystyrene basis).

The polysiloxane polycarbonate copolymer component can be present in the thermoplastic composition in any desired amount. For example, in aspects of the disclosure, the polysiloxane polycarbonate copolymer is present in an amount of about 0 wt % to about 30 wt % of a polycarbonate-polysiloxane copolymer component relative to the total weight of the thermoplastic composition. In various further aspects, the polysiloxane polycarbonate copolymer is present in an amount of at least about 1 wt % relative to the total weight of the thermoplastic composition. For example, the polycarbonate-polysiloxane copolymer can be present in an amount in the range of from 1 wt % to 30 wt % relative to the total weight of the thermoplastic composition, including exemplary amounts of 0.1 wt %, 0.25 wt %, 0.5 wt %, 1.0 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, and 30 wt %. In still further aspects, the polysiloxane polycarbonate copolymer can be present within any range of amounts derived from any two of the above stated values. For example, the polysiloxane polycarbonate copolymer can be present in an amount in the range of from about 1 to about 5 wt %, or in an amount in the range of from about (or from) 1 wt % to about (or to) 10 wt %.

In one aspect, the polycarbonate-polysiloxane copolymer component is a polycarbonate-polydimethylsiloxane copolymer. In another aspect, the polycarbonate portion of the polycarbonate-polysiloxane copolymer comprises residues derived from BPA. In still another aspect, the polycarbonate portion of the polycarbonate-polysiloxane copolymer comprising residues derived from BPA is a homopolymer. In still another aspect, the polycarbonate-polysiloxane copolymer component comprises a polycarbonate-polysiloxane block copolymer.

In one aspect, the polycarbonate-polysiloxane block copolymer comprises a polycarbonate-polydimethylsiloxane block copolymer. In another aspect, the polycarbonate block comprises residues derived from BPA. In still other aspect, the polycarbonate block comprising residues derived from BPA is a homopolymer.

In one aspect, the polycarbonate-polysiloxane block copolymer comprises from about (or from) 3 wt % to about (or to) 10 wt % siloxane. In another aspect, the polycarbonate-polysiloxane block copolymer comprises from about (or from) 4 wt % to about (or to) 8 wt % siloxane. In still another aspect, the polycarbonate-polysiloxane block copolymer comprises about (or comprises) 5 wt % siloxane. In still another aspect, the polycarbonate-polysiloxane block copolymer comprises about (or comprises) 6 wt % siloxane. In still another aspect, the polycarbonate-polysiloxane block copolymer comprises about (or comprises) 7 wt % siloxane. In still another aspect, the polycarbonate-polysiloxane block copolymer comprises about (or comprises) 8 wt % siloxane.

In one aspect, the PC-Si copolymer has a weight average molecular weight from about (or from) 20,000 to about (or to) 26,000 Daltons (polystyrene basis). In another aspect, the PC-Si block copolymer has a weight average molecular weight from about (or from) 21,000 to about (or to) 25,000 Daltons. In still another aspect, the PC-Si block copolymer has a weight average molecular weight from about (or from) 22,000 to about (or to) 24,000 Daltons (polystyrene basis). In still another aspect, the PC-Si block copolymer has a weight average molecular weight of about (or of) 22,000 Daltons (polystyrene basis). In still another aspect, the PC-Si block copolymer has a weight average molecular weight of about (or of) 23,000 Daltons (polystyrene basis). In still another aspect, the PC-Si block copolymer has a weight average molecular weight of about (or of) 24,000 Daltons (polystyrene basis). In still another aspect, the PC-Si block copolymer has a weight average molecular weight of about (or of) 25,000 Daltons (polystyrene basis).

In one aspect, the polycarbonate-polysiloxane block copolymer comprises from about (or from) 1 wt % to about (or to) 25 wt % siloxane. In another aspect, the polycarbonate-polysiloxane block copolymer comprises from about (or from) 11 wt % to about (or to) 23 wt % siloxane. In still another aspect, the polycarbonate-polysiloxane block copolymer comprises from about (or from) 18 wt % to about (or to) 22 wt % siloxane. In still another aspect, the polycarbonate-polysiloxane block copolymer comprises from about (or from) 19 wt % to about (or to) 21 wt % siloxane. In still another aspect, the polycarbonate-polysiloxane block copolymer comprises about (or comprises) 18 wt % siloxane. In still another aspect, the polycarbonate-polysiloxane block copolymer comprises about (or comprises) 19 wt % siloxane. In still another aspect, the polycarbonate-polysiloxane block copolymer comprises about (or comprises) 20 wt % siloxane. In still another aspect, the polycarbonate-polysiloxane block copolymer comprises about (or comprises) 21 wt % siloxane. In still another aspect, the polycarbonate-polysiloxane block copolymer comprises about (or comprises) 22 wt % siloxane.

In one aspect, the polysiloxane block has a weight average molecular weight from about (or from) 25,000 to about (or to) 32,000 Daltons (polystyrene basis). In another aspect, the polysiloxane block has a weight average molecular weight from about (or from) 26,000 to about (or to) 31,000 Daltons (polystyrene basis). In still another aspect, the polysiloxane block has a weight average molecular weight from about (or from) 27,000 to about (or to) 30,000 Daltons (polystyrene basis). In still another aspect, the polysiloxane block has a weight average molecular weight from about (or from) 28,000 to about (or to) 30,000 Daltons (polystyrene basis). In still another aspect, the polysiloxane block has a weight average molecular weight of about (or of) 27,000 Daltons (polystyrene basis). In still another aspect, the polysiloxane block has a weight average molecular weight of about (or of) 28,000 Daltons. In still another aspect, the polysiloxane block has a weight average molecular weight of about (o of) 29,000 Daltons (polystyrene basis). In still another aspect, the polysiloxane block has a weight average molecular weight of about (or of) 30,000 Daltons (polystyrene basis). In still another aspect, the polysiloxane block has a weight average molecular weight of about (or of) 31,000 Daltons (polystyrene basis).

Further disclosure regarding polycarbonates and polysiloxanes may be found in published United States patent applications US 2014/0357781 and US 2014/0200303, both of which are incorporated herein by reference in their entireties for any and all purposes.

Polyesters

Cycloaliphatic polyesters can also be used and are generally prepared by reaction of organic polymer precursors such as a diol with a dibasic acid or derivative. The diols useful in the preparation of the cycloaliphatic polyester polymers are straight chain, branched, or cycloaliphatic, preferably straight chain or branched alkane diols, and can contain from 2 to 12 carbon atoms.

One or more fillers may be used, e.g., glass fibers, TiO2, zinc sulfide, or boron nitride.

In addition to the thermoplastic polymer resin and fillers, the compositions of the present invention can include various additives ordinarily incorporated in resin compositions of this type. Mixtures of additives can be used. Such additives can be mixed at a suitable time during the mixing of the components for forming the composition. The one or more additives are included in the thermoplastic compositions to impart one or more selected characteristics to the thermoplastic compositions and any molded article made therefrom. Examples of additives that can be included in the present invention include, but are not limited to, heat stabilizers, process stabilizers, antioxidants, light stabilizers, plasticizers, antistatic agents, mold releasing agents, UV absorbers, lubricants, pigments, dyes, colorants, flow promoters, flame retardants, or a combination of one or more of the foregoing additives.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate, polyether block amides, which are commercially available from, for example, BASF under the Tradename Irgastat™; from Arkema under the Tradename PEBAX™; and from Sanyo Chemical industries under the tradename Pelestat™, or combinations of the foregoing antistatic agents. In one embodiment, carbon fibers, carbon nanofibers, carbon nanotubes, carbon black, or any combination of the foregoing can be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™. 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™(UV-3638); 1,3-bis[(2-cyano-3,3-diphenylacryloyl)oxy]-2,2-bis[[(2-cyano-3,3-diphenyl-acryloyl) oxy]methyl]propane (UVINU™. 3030); 2,2'-(1,4-phenylene) bis(4H-3,1-benzoxazin-4-one); 1,3-bis[(2-cyano-3, 3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a) phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethyl-amino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IRS; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties can be added to the composition, such as low molecular weight hydrocarbon resins or dendritic polyols (such as Boltorn from Perstop) or dendritic polyesteramides (such as Hybrane™ from DSM). Particularly useful classes of low molecular weight hydrocarbon resins are those derived from petroleum C5 to C9 feedstock that are derived from unsaturated C5 to C9 monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of flame retardants include, but are not limited to, halogenated flame retardants, like tretabromo bisphenol A oligomers such as BC58 and BC52, brominated polystyrene or poly(dibromo-styrene), brominated epoxies, decabromodiphenyleneoxide, pentabrombenzyl acrylate monomer, pentabrombenzyl acrylate polymer, ethylene-bis (tetrabromophthalimide, bis(pentabromobenzyl)ethane, metal hydroxides like $Mg(OH)_2$ and $Al(OH)_3$, melamine cyanurate, phosphor based FR systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl)sulfanylimide potassium salt, or a combination containing at least one of the foregoing. Fillers and additives can be added in amounts ranging from about 0.1 to about 40% or even about 50% by weight percent of the total composition.

Illustrative Embodiments

As explained herein, foamed, micro-cellular structures exhibit improved reflectivity in certain wavelengths, e.g., the 315-420 nm range; reflectivity in the range of 380-420 nm is of particular interest. Without being bound to any particular theory, in general the smaller the cell size, the higher the reflectivity.

Exemplary foamed/micro-cellular structures may be obtained by injection molding PC on an injection molding machine equipped with a cell-forming technology (e.g., MuCell™ technology) and heat and cool capability. For the examples given herein, nitrogen was be used as "foaming" gas, although other gases will be known to those of skill in the art.

For these exemplary materials, a MuCell unit injected nitrogen at high pressure (350 bar) into molten polycarbonate (PC) (having a weight-average molecular weight, on a polystyrene basis, of about 70 kDaltons) that was injected into a heated mold. During the filling of the mold, gas counter pressure may be used to prevent desaturation of nitrogen in the PC-melt. After a hold time, the mold is allowed to expand to a certain thickness and allowed to cool down before being ejected. Without being bound to any particular theory, cell size may be influenced with mold temperature, holding time and by whether or not gas counter pressure is used.

Again without being bound to any particular theory, the use of gas counter pressure (GCP) gives in general smaller cell size as without GCP. Increasing the holding time results in a more homogeneous material temperature and a more homogeneous cell size. For high molecular weight PC, a mold temperature of 165° C. provided favorable results; higher temperatures result in larger cells sizes and hence lower reflectivity. For the examples provided herein, reflectivity was measured on a Perkin Elmer Lambda 950 spectrophotometer with a 150 mm reflective sphere, Spectralon coated.

Table 1 below provides the composition of the starting materials being used. PC 2 and PC3 contain a so-called heterogeneous nucleant (talc and silica, in this case) whereas PC4 (6% siloxane by weight of the copolymer; copolymer based on siloxane bisphenol-A copolymer made by interfacial polymerization) uses a siloxane block in the PC-siloxane copolymer as a homogeneous nucleant.

TABLE 1

Composition formulations for microcellular molding

| Material coded as | PC-1 | PC-2 | PC-3 | PC-4 |
|---|---|---|---|---|
| PC % | 99.95 | 99.45 | 99.45 | 24.95 |
| EXL-T % | | | | 75 |
| stab. % | 0.05 | 0.05 | 0.05 | 0.05 |
| Fumed Silica % | | 0.5 | | |
| Fine Talc % | | | 0.5 | |
| Molding parameters | | | | |
| Pre drying temp ° C. | 120 | 120 | 120 | 120 |
| Pre-drying time hrs | 3-4 | 3-4 | 3-4 | 3-4 |
| max. Moisture content % | 0.02 | 0.02 | 0.02 | 0.02 |
| Melt temp. ° | 320-345 | 320-345 | 320-345 | 320-345 |
| Nozzle temp ° C. | 315-340 | 315-340 | 315-340 | 315-340 |
| Front barrel ° C. | 320-345 | 320-345 | 320-345 | 320-345 |
| Middle barrel ° C. | 310-330 | 310-330 | 310-330 | 310-330 |
| End barrel ° C. | 300-320 | 300-320 | 300-320 | 300-320 |

These materials were converted into injection molded foamed-microcellular structures using the set-up (injection molding machine with MuCell and heat and cool technology) as described above and under the conditions shown in Table 2.

FIG. 1 provides reflectivity at 315-400 nm, (UV-A range), violet range (380-420 nm) and 400-700 nm (visible light range). For comparison, the reflectivity data of high-reflective PC, PBT, and Polyamide based on high-refractive index fillers (TiO2) are displayed in FIG. 1, and the molding conditions for these comparative materials are listed in FIG. 1.

TABLE 2

Injection molding conditions comparative samples

| | | C1 | C2 | C3 |
|---|---|---|---|---|
| Drying time | (hrs) | 2 | 2 | 4 |
| Drying temperature | (° C.) | 120 | 120 | 80 |
| T hopper | (° C.) | 40 | 40 | 40 |
| T zone 1 | (° C.) | 280 | 240 | 270 |
| T zone 2 | (° C.) | 285 | 250 | 280 |
| T zone 3 | (° C.) | 295 | 260 | 290 |
| T nozzle | (° C.) | 290 | 255 | 285 |
| T mold | (° C.) | 110 | 90 | 120 |

As seen in FIG. 1, using high-refractive index fillers yields materials with notable reflectivity in the visible range (400-700 nm) but with relatively reduced reflectivity in the ultraviolet range (315-400 nm). By contrast, the disclosed micro-cellular products (FIG. 1) not only have a high reflectivity in the visible range but also exhibit significant improved reflectivity in the ultraviolet (315-400 nm) and violet spectrum (380-420 nm), as compared with the high-reflective grades based on high-refractive fillers C1 (a PC), C2 (a PBT), and C3 (a polyamide).

As additionally, seen in FIG. 1, the disclosed materials exhibited surprisingly enhanced reflectivity as compared to various "Competitive Products." In particular, the disclosed polycarbonate articles exhibit enhanced reflectivity as compared to the polycarbonate comparative product, which material was an extruded polycarbonate microcellular reflector material.

Without gas counter pressure (samples 1 and 11), the reflectivity both in the ultraviolet range (315-400 nm), the violet range (380-420 nm) and visible range (400-700 nm) is lower than the reflectivity of the comparable samples produced under similar conditions with the gas counter pressure (sample 2 and 12). SEM investigations indicate that without the GCP, cell sizes were larger and had a broader distribution. Without foaming or the addition of high-refractive fillers, reflectivity of straight PC whether in the ultraviolet or visible range was rather low (sample 10).

Without being bound to any particular theory, addition of talc may lead to some discoloration of the PC, which causes the lower overall reflectivity results of the PC3 samples compared to the PC2 samples.

Without being bound to any particular theory, there was a positive effect of increasing the holding time which would results in a more homogeneous temperature throughout the sample before expansion of the mold and probably a more homogeneous cell structure, but further experiments are needed to validate this.

Micrographs of Sample 4 (FIGS. 1a and 1b) and Sample 15 show a difference in cell size. Reflectivity of Sample 15 was also lower.

As compared to standard high reflective PC grades based on high-reflective fillers and as compared to other comparative products, the disclosed microcellular structures show a significant improved reflection in the ultraviolet as well as the violet range and are well-suited to be combined with violet pumped LEDs to give a crisper white appearance of objects in addition to more life-like warm tints. Thus, the disclosed microcellular systems outperformed even high-reflective additive-based materials.

The following aspects are illustrative only and do not serve to limit the scope of the present disclosure or the claims appended hereto.

Aspect 1. An article, comprising: a plastic region having a cellular structure comprising a plurality of cells. The plastic region may comprise a thermoset, a thermoplastic, or both. Polycarbonate is considered a particularly suitable thermoplastic. The plurality of cells may have a number-average cross-sectional dimension in the range of from about (or of) 0.01 micrometers up to about (or to) 100 micrometers, the region of thermoplastic having a reflectivity of at least about (or at least) 80% for illumination in the range of from about (or of) 380 nm to about (or to) 420 nm. The plurality of cells may have a number-average cross-sectional dimension in the range of from about (or from) 1 micrometer up to about (or up to) 80 micrometers, or from about (or from) 5 micrometers up to about (or up to) 40 micrometers, or even from about (or from) 10 micrometers up to about (or up to) 15 micrometers.

Although polycarbonate is an especially suitable thermoplastic, other thermoplastics (polyesters, PET, polyamides, PBT) are also suitable, and one of ordinary skill in the art will encounter no difficulty in identifying thermoplastics. Mixtures of two, three, or more thermoplastics are considered suitable. Thermosets (e.g., polyurethane, thermosetting polyester, polyimide) are also considered suitable.

Suitable articles include reflectors, housings, collars, and the like. It should be understood that an article may be a film or a sheet in configuration. An article may have an entire through-thickness that has the disclosed characteristics (e.g., a sheet, the entire sheet having the disclosed characteristics). Alternatively, an article may include a region (e.g., a 1 mm thick surface layer that is part of a thicker overall article) that has the disclosed characteristics. The disclosed cellular thermoplastics may even be applied as a layer (e.g., via adhesive, bonding, heat-sealing, or other attachment methods) to an existing article, e.g., a reflector already in service. An article may include a microcellular region (e.g., at the surface) and a region that does not include a cellular structure.

The disclosed articles and methods are particularly suitable for use in shop and museum lighting applications, as well as other commercial and even residential lighting applications.

The reflectivity for illumination in the range of from 380 nm to 420 nm may be 85%, 87%, 89%, 91%, 93%, 95%, 97% or greater. Above 90% is considered especially suitable.

The disclosed articles may have a reflectivity for illumination in the range of from 315-400 nm of 55-100%, 65-100%, or even 75-100%, and all intermediate values. The disclosed articles may have a reflectivity for illumination in the range of from 380-420 nm of 55-100%, 65-100%, or even 75-100%, and all intermediate values. The disclosed articles may have a reflectivity for illumination in the range of from 400-700 nm of 55-100%, 65-100%, or even 75-100%, and all intermediate values.

Cells having a number-average cross-sectional dimension in the range of less than 40 micrometers are especially suitable, in particular cells having a number-average cross-sectional dimension of less than 10 micrometers.

Aspect 2. The article of aspect 1, wherein the plurality of cells has a spatial density in the range of from $10^3$ cells/cm$^3$ to $10^{15}$ cells/cm$^3$, e.g., from about $10^6$ to about $10^{12}$ cells/cm$^3$.

Aspect 3. The article of any of aspects 1-2, wherein the plurality of cells represents from about (or from) 5 to about (or to) 70 vol % of the region of thermoplastic. In some embodiments, cells are sized and dispersed such that they reduce the density of the matrix (as compared to a cell-free matrix) by from 10% to 90%, and all intermediate values. Reducing the density by 60% is considered especially suitable. The microcellular materials may have a density of from about (or of) 5% to about (or to) 99% of the base thermoplastic (uncelled) material, e.g., 40% of the uncalled material.

Aspect 4. The article of any of aspects 1-3, wherein at least 50%, at least 60%, at least 70%, at least 80%, at least 90%, or even the entire plurality of cells, by number, are characterized as closed cells. Pluralities of cells that are from 70-95% (by number) closed cells are considered especially suitable.

As is known in the art, cells in foam are bubbles that have been frozen in size and shape after solidification of a polymer melt. Two types of cells are open and closed cells.

In closed cell foams, each cell is an independent, closed entity. The walls of gas bubbles have no holes in them. The cell will contain gas if the polymer is impermeable to gas used for foaming.

So-called "open" cells are interconnected and are thus unable to hold gas. They are broken, and air fills the open space inside material. This in turn makes the foam weaker or softer. The advantages of closed-cell foam compared to open-cell foam include its strength, higher R-value, and its greater resistance to the leakage of air or water vapor.

Aspect 5. The article of any of aspects 1-4, wherein at least 20% of the plurality of cells, by number, are characterized as having an aspect ratio of between about 1 and about 5 (e.g., spherical cells). In an article, up to 30%, 40%, 50%, 60%, 70%, 80%, 90% or even all of the cells may be characterized as spherical.

Aspect 6. The article of any of aspects 1-4, wherein at least at least 50% of the plurality of cells, by number, are characterized having an aspect ratio of between about (or between) 1 and about (or and) 5. In an article, up to 30%, 40%, 50%, 60%, 70%, 80%, 90% or even all of the cells may be characterized as having as aspect ratio of between about 1 and about 5.

Aspect 7. The article of any of aspects 1-6, wherein the plastic region (e.g., thermoplastic, thermoset) further comprises an additive. Suitable additives are described elsewhere herein, but may include, without limitation, nucleants, clay (including nanoclay materials comprising particles having a cross-sectional dimension of less than about 100 nm), rubber, TPE (thermoplastic elastomer), coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations thereof.

In a further aspect, the blend thermoplastic compositions of the present invention further may comprise at least one polymer additive selected from a flame retardant, a colorant, a primary anti-oxidant, and a secondary anti-oxidant.

Aspect 8. The article of aspect 7, wherein the additive comprises a nucleant, clay, rubber, a TPE particle, or any combination thereof.

Aspect 9. The article of aspect 8, wherein the nucleant comprises talc, silica, siloxane, clay, or any combination thereof.

Aspect 10. The article of aspect 8, wherein the nucleant comprises talc, silica, clay, or any combination thereof, and wherein the nucleant is present at up to about (or up to) 30 wt %, or even up to 20 wt % of the weight of the plastic region. Nucleant loading of less than 5 wt % (e.g., 1.0 or 0.5 wt %) is considered especially suitable.

Aspect 11. The article of aspect 9, wherein the nucleant comprises siloxane. The siloxane may be present at up to 30 wt %, e.g., at 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %.

Aspect 12. The article of aspect 11, wherein the siloxane is copolymerized with the plastic (e.g., a siloxane-thermoplastic copolymer). PC-Si polymers are considered suitable and are described elsewhere herein. Copolymers include block, branched, and all other forms of copolymers.

Aspect 13. The article of aspect 11, wherein the siloxane is admixed with the plastic. In these embodiments, the siloxane (which should be understood as including polysiloxane) is present with the plastic but is not co-polymerized with the plastic. One exemplary composition is PC-Si copolymer and siloxane admixed therewith.

Aspect 14. The article of aspect 11, wherein the PC-Si block copolymer has an average block length of from about (or from) 20 to about (or to) 100 (and all intermediate values), e.g., 30, 40, 50, 60, 70, 80, 90, 100.

Aspect 15. The article of aspect 1, wherein the article has a reflectivity of from about 50% to about 99% for illumination in the range of from about (or from) 315 nm to about (or to) 380 nm. An article may have a reflectivity for illumination in the range of from about (or from) 315 nm to about (or to) 380 nm of from about (or from) 55 to about (or to) 95%, or from about (or from) 55 to about (or to) 95%, or from about (or from) 60 to about (or to) 90%, or from about (or from) 65 to about (or to) 85%, or from about (or from) 70 to about (or to) 80%, or even about (or even) 75%.

Aspect 16. The article of aspect 1, wherein the ratio of the article's reflectivity for illumination in the range of from 380 to 420 nm to the reflectivity for illumination in the range of from 315 to 380 nm is from about (or from) 1.0 to about (or to) 2, e.g., from about (or from) 1.1 to about (or to) 1.9, or from about (or from) 1.2 to about (or to) 1.8, or from about (or from) 1.3 to about (or to) 1.7, or from about (or from) 1.4 to about (or to) 1.6, or even about (or even) 1.5.

Aspect 17. The article of aspect 1, wherein the plastic region is substantially free of swirl marks. The presence of swirl marks may be determined by visual inspection. In some embodiments, the article may comprise (in an amount from about (or from) 1 wt % to about (or to) 10 wt %) one or more splay-reducing components, e.g., polyester polymer, an (isophthalic acid-terephthalic acid-resorcinol)-bisphenol A copolyestercarbonate copolymer, or combinations thereof. In some embodiments, the splay-reducing component is not fully miscible with the plastic component. In some embodiments, the splay-reducing component is an (isophthalic acid-terephthalic acid-resorcinol)-bisphenol A copolyestercarbonate copolymer. In some embodiments, the splay-reducing component is a polyester, e.g., a poly(alkylene terephthalate)

Aspect 18. The article of aspect 7, wherein the additive comprises ZnS, TiO2, BN, or any combination thereof. Additive may be present at up to about (or up to) 20 wt %, up to about (or up to) 15 wt %, up to about (or up to) 10 wt %, up to about (or up to) 5 wt %, up to about (or up to) 1 wt %, up to about (or up to) 0.5 wt %, or even up to about (or even up to) 0.1 wt %. TiO2 levels of up to about 1 wt % are considered useful. ZnS and BN are considered particularly suitable additives.

Aspect 19. The article of any of aspects 1-18, wherein at least 50% of the plurality of cells have a cross-sectional dimension that is within 70%, within 20%, within 10%, within 5%, within 2%, within 1%, within 0.5%, or even within 0.1% of the number-average cross-sectional dimension for the plurality of cells.

Aspect 20. The article of any of aspects 1-19, wherein the plastic comprises a polycarbonate having a weight-average molecular weight (polystyrene basis) of from about (or from) 10 to about (or to) 100 kDaltons. Suitable weight-average molecular weights may also be from about (or from) 15 to about (or to) 95, from about (or from) 20 to about (or to) 90, from about (or from) 25 to about (or to) 85, from about (or from) 25 to about (or to) 80, from about (or from) 30 to about (or to) 70, from about (or from) 40 to about (or to) 50, or even about (or even) 50 kDaltons (polystyrene basis).

Aspect 21. The article of aspect 20, wherein the plastic comprises a polycarbonate having a weight-average molecular weight (polystyrene basis) of from about (or from) 40 to about (or to) 50 kDaltons (polystyrene basis).

Aspect 22. A method, the method comprising illuminating an article according to any of aspects 1-21. The article may be configured (e.g., positioned) so as to reflect the illumination onto a target (e.g., artwork, merchandise), or to reflect the illumination into the environment (e.g., into a living space). The illumination may include illuminating with a violet or violet-pumped LED, with a blue-pumped LED, or any combination thereof. Thus, the disclosed articles may be combined (e.g., in a shop, museum, or other lighting device) with a violet-pumped LED such that illumination from the LED impinges on the reflective article. Such an arrangement may be, e.g., a display case, an art display unit, or other lighting installation.

As mentioned elsewhere herein, the disclosed articles exhibit improved reflectivity. The illumination may be provided by an incandescent illuminator, a halogen illuminator, or even by an LED. Suitable LEDs include violet-pumped light-emitting diodes, which may have increased output in the 380-420 nm or 380-430 nm range compared to so-called blue LEDs (blue LEDs may have a peak output in the wavelength range of, e.g., about 450 to about 500 nm). Blue-pumped LEDs may also be used as illumination sources.

White light is obtained by converting the blue-emitted light via either a so-called blue-pumped 2-phosphor system or a violet pumped 3-phosphor based system. The violet pumped LEDs may exhibit a "violet" spike and a "valley" of blue, although not as exaggerated as the "valley of cyan" in blue-pumped LEDs. Violet pumped LEDs are from a spectral distribution more reminiscent of black-body emitters as halogen and incandescent light. Therefore they typically have a higher CR1.

A user may apply (e.g., via adhesive) an article according to the present disclosure to an existing surface so as to alter the reflectivity characteristics of that surface. This may be done, for example, to re-fit a display arrangement after an illumination source has been changed from, e.g., an incandescent source to a violet-pumped LED. An article may also be press-fit, mechanically fixed, or otherwise positioned about or fixed to a surface.

Aspect 23. An injection-molded article, comprising a plastic region having a cellular structure comprising a plurality of cells, the plurality of cells having a number-average cross-sectional dimension in the range of from about (or from) 0.01 micrometers up to about (or up to) 100 micrometers, the region of plastic having a reflectivity of at least about (or at least) 80% for illumination in the range of from about (or from) 380 nm to about (or to) 420 nm. (It should be understood that extruded articles having the disclosed structural characteristics are also within the scope of the present disclosure.)

Without being bound to any particular theory, one may fabricate injection-molded articles by simultaneously molding and foaming (i.e., forming cells within) the matrix material (e.g., thermoplastic, thermoset). A user may also injection mold previously-foamed material.

The plurality of cells may have a number-average cross-sectional dimension in the range of from about 1 micrometer up to about 80 micrometers, or from about 5 micrometers up to about 40 micrometers, or even from about 10 micrometers up to about 15 micrometers.

Aspect 24. The article of aspect 23, wherein the plurality of cells has a spatial density in the range of from 100 cells/cm$^3$ to 10$^{15}$ cells/cm$^3$, e.g., about 10$^6$ to about 10$^{12}$ cells/cm$^3$.

Aspect 25. The article of aspects 23 or 24, wherein the plurality of cells represents from about (or from) 5 to about (or to) 60 vol % of the region of plastic. In some embodiments, the cells are sized and dispersed such that they reduce the density of the matrix (as compared to a cell-free matrix) by from 10% to 90%, and all intermediate values. Reducing the density by 60% is considered especially suitable.

Aspect 26. The article of aspect 23, wherein at least 50%, at least 60%, at least 70%, at least 80%, at least 90%, or even the entire plurality of cells, by number, are characterized as closed cells. Pluralities of cells that are from 70-95% (by number) closed cells are considered especially suitable. (Closed cells are described elsewhere herein.)

Aspect 27. The article of aspect 23, wherein at least 20% of the plurality of cells, by number, are characterized as having an aspect ratio between about 1 and about 5 (e.g., spherical cells). In an article, up to 30%, 40%, 50%, 60%, 70%, 80%, 90% or even all of the cells may be characterized as spherical.

Aspect 28. The article of aspect 23, wherein at least at least 50% of the plurality of cells, by number, are characterized having an aspect ratio of between about 1 and about 5. In an article, up to 30%, 40%, 50%, 60%, 70%, 80%, 90% or even all of the cells may be characterized as having as aspect ratio of between about 1 and about 5.

Aspect 29. The article of any of aspects 23-28, wherein the plastic region further comprises an additive. Suitable additives are described elsewhere herein, but may include, without limitation, nucleants, clay, rubber, TPE (thermoplastic elastomer), coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations thereof. In a further aspect, the blended plastic compositions of the present invention further comprise at least one polymer additive selected from a flame retardant, a colorant, a primary anti-oxidant, and a secondary anti-oxidant.

Aspect 30. The article of aspect 29, wherein the additive comprises a nucleant.

Aspect 31. The article of aspect 30, wherein the nucleant comprises talc, silica, siloxane, clay, or any combination thereof.

Aspect 32. The article of aspect 30, wherein the nucleant comprises talc, silica, clay, or any combination thereof, and wherein the nucleant is present at up to about (or at up to) 30 wt %, or even up to 20 wt %.

Aspect 33. The article of aspect 31, wherein the nucleant comprises siloxane present at up to 20 wt %.

Aspect 34. The article of aspect 33, wherein the siloxane is copolymerized with the plastic. PC-Polysiloxane polymers are one such example and are described elsewhere herein. Copolymerized materials include block, branched, and all other forms of copolymers.

Aspect 35. The article of aspect 33, wherein the siloxane is admixed with the plastic.

Aspect 36. The article of any of aspects 23-35, wherein the article has a reflectivity of from about (or from) 50% to about (or to) 99% for illumination in the range of from about 315 nm to about 380 nm.

Aspect 37. The article of any of aspects 23-36, wherein the ratio of the article's reflectivity for illumination in the range of from 380 to 420 nm to the reflectivity for illumination in the range of from 315 to 380 nm is from about 1.05 to about 1.5.

Aspect 38. The article of any of aspects 23-37, wherein the thermoplastic region is substantially free of swirl marks. In some embodiments, the article may comprise (in an amount from about (or from) 1 wt % to about (or to) 10 wt %) one or more splay-reducing components, e.g., polyester polymer, an (isophthalic acid-terephthalic acid-resorcinol)-bisphenol A copolyestercarbonate copolymer, or combinations thereof. In some embodiments, the splay-reducing component is not fully miscible with the plastic component. In some embodiments, the splay-reducing component is an (isophthalic acid-terephthalic acid-resorcinol)-bisphenol A copolyestercarbonate copolymer. In some embodiments, the splay-reducing component is a polyester, e.g., a poly(alkylene terephthalate)

Aspect 39. The article of aspect 29, wherein the additive comprises ZnS, TiO2, BN, or any combination thereof. Additive may be present at up to about (or up to) 20 wt %, up to about (or up to) 15 wt %, up to about (or up to) 10 wt %, up to about (or up to) 5 wt %, up to about (or up to) 1 wt %, up to about (or up to) 0.5 wt %, or even up to about (or even up to) 0.1 wt %. ZnS and BN are considered particularly suitable additives.

Aspect 40. The article of any of aspects 23-39, wherein at least 50% of the plurality of cells have a cross-sectional dimension that is within 70%, within 20%, within 10%, within 5%, within 2%, within 1%, within 0.5%, or even within 0.1% of the number-average cross-sectional dimension for the plurality of cells.

Aspect 41. The article of aspect 23, wherein the plastic comprises a polycarbonate having weight-average molecular weight (polystyrene basis) of from about (or from) 10 to about (or to) 100 kDaltons (polystyrene basis. Suitable weight-average molecular weights may also be from about (or from) 15 to about (or to) 95, from about (or from) 20 to about (or to) 90, from about (or from) 25 to about (or to) 85, from about (or from) 25 to about (or to) 80, from about (or from) 30 to about (or to) 70, from about (or from) 40 to about (or to) 50, or even about (or even) 50 kDaltons (polystyrene basis).

Aspect 42. The article of aspect 40, wherein the plastic comprises a polycarbonate having a weight-average molecular weight (polystyrene basis) of from about (or from) 30 to about (or to) 70 kDaltons.

Aspect 43. A method, comprising illuminating an article according to any of aspects 23-42. The article may be configured (e.g., positioned) so as to reflect the illumination onto a target (e.g., artwork, merchandise), or to reflect the illumination into the environment (e.g., into a living space). The illumination may include illuminating (the article) with a violet or violet-pumped LED.

As mentioned elsewhere herein, the disclosed articles exhibit improved reflectivity. The illumination may be provided by an incandescent illuminator, a halogen illuminator, or even by an LED. Suitable LEDs include violet-pumped light-emitting diodes, which have a more significant output in the 380-420 nm range compared to so-called blue LED's. White light is obtained by converting the blue-emitted light via either a so-called blue-pumped 2-phosphor system or a violet pumped 3-phosphor based system. Violet pumped LEDs may exhibit a "violet" spike and a "valley" of blue, although not as exaggerated as the "valley of cyan" in blue-pumped LEDs. Violet pumped LEDs are from a spectral distribution more reminiscent of black-body emitters as halogen and incandescent light. Without being bound to any particular theory, such LEDs have a relatively high CRI.

Aspect 44. An article, comprising a plastic region having a cellular structure comprising a plurality of cells, the plurality of cells having a number-average cross-sectional dimension in the range of from about (or from) 0.3 micrometers up to about (or up to) 100 micrometers, the region of plastic having a reflectivity of at least about (or of at least) 80% for illumination in the range of from about (or from) 380 nm to about (or to) 420 nm, the plastic region further comprising an amount of siloxane of up to 20 wt % of the total weight of the plastic region.

Aspect 45. The article of aspect 44, wherein the article is characterized as being injection molded.

Aspect 46. The article of any of aspects 44-45, wherein the siloxane is copolymerized with the plastic.

Aspect 47. The article of any of aspects 44-45, wherein the siloxane is admixed with the plastic.

Aspect 48. The article of any of aspects 44-47, wherein the siloxane has an average block length of from about (or from) 20 to about (or to) 100.

Aspect 49. A method, comprising illuminating an article according to any of aspects 44-48. The illumination may include illuminating with a violet or violet-pumped LED.

In one exemplary embodiment, an article (e.g., a reflector) according to the present disclosure is illuminated by a violet-pumped LED. The reflector and LED may be part of a single unit, such as a spotlight, a luminaire, a chandelier, a ceiling light, a floor lamp, a desk light, a display case, a vehicle light (exterior or interior), an office light, or any combination thereof. As described elsewhere herein, the unit may include reflectors, housings, collars, and the like. It should be understood that an article may be a film or a sheet in configuration. An article may have an entire through-thickness that has the disclosed characteristics (e.g., a sheet, the entire sheet having the disclosed characteristics). Alternatively, an article may include a region (e.g., a 1 mm thick surface layer that is part of a thicker overall article) that has the disclosed characteristics. The disclosed cellular plastics may even be applied as a layer (e.g., via adhesive, bonding, mechanical attachment, heat-sealing, or other attachment methods) to an existing article, e.g., a reflector already in service. An article may include a microcellular region (e.g., at the surface) and a region that does not include a cellular structure.

Aspect 50. A method of modifying illumination performance, comprising in an illumination device having a surface configure to reflect illumination, replacing or covering at least some of said surface with an article according to any of aspects 1-21, 23-43, or 44-48.

Aspect 51. A method of fabricating a reflective article, comprising: injection-molding a plastic material and foaming the plastic material so as to give rise to an article according to any of aspects 1-21, 23-43, or 44-48. The method may be performed—at least in part—using a MuCell™ device or process. Other foaming devices and methods will be known to those of ordinary skill in the art. As described elsewhere, the article may be a sheet or film, but may also be a shaped part, e.g., a collar, shade, housing, and the like. An article may be shaped so as to conform to at least a portion of an existing article, e.g., the reflector of an existing ceiling illuminator device.

Aspect 52. An article according to any of aspects 1-21, 23-43, or 44-48, wherein the article further comprises an amount of phosphor.

Aspect 53. The article of aspect 52, wherein the phosphor is disposed on a surface of the article (e.g., a surface of the article that receives illumination). The phosphor may also be disposed within the article. For example, a user may incorporate an amount of phosphor within plastic material such that the phosphor is present within the plastic following molding and/or foaming.

As but one example, a violet-pumped LD may include multiple phosphors (e.g., Soraa Corporation's LED AR111™, PAR30™, and PAR38™ products), and a user may elect to use a reflective article that includes an amount of one or more of those phosphors. Suitable such phosphors include, without limitation, GaN, InGaN, YAG, ZnS:Cu, Al, and the like. The phosphor present in the article may function as a remote phosphor.

Aspect 54. An article, comprising: a region having a cellular structure comprising a plurality of cells. The region may comprise plastic, metal, glass, carbon, or any combination thereof. As one example, an article may comprise metallic (e.g., Fe, Cu) nanoparticles, carbon nanoparticles, or carbon nanotubes dispersed in a plastic matrix.

The plurality of cells may have a number-average cross-sectional dimension in the range of from about (or from) 0.01 micrometers up to about (or up to) 100 micrometers, the region of thermoplastic having a reflectivity of at least about 80% for illumination in the range of from about (or from) 380 nm to about (or to) 420 nm. The plurality of cells may have a number-average cross-sectional dimension in the range of from about (or from) 1 micrometer up to about (or up to) 80 micrometers, or from about (or from) 5 micrometers up to about (or up to) 40 micrometers, or even from about (or from) 10 micrometers up to about (or up to) 15 micrometers. The articles may include one or more features of any of the preceding aspects. The articles may also be used in methods according to any of the preceding aspects.

Aspect 55. The article according to any of aspects 1-21, 23-43, 44-48, 52, or 54, the article further comprising a violet-pumped LED. As described elsewhere herein, the violet-pumped LED may be configured or otherwise positioned to direct illumination to the article.

What is claimed:

1. An article, comprising:
    A region of plastic having a cellular structure comprising a plurality of cells,
    the plurality of cells having a number-average cross-sectional dimension in the range of from about 0.3 micrometers up to about 100 micrometers,
    the region of plastic having a reflectivity of at least about 80% for illumination in the range of from about 380 nm to about 420 nm
wherein a ratio of the article's reflectivity for illumination in the range of from 380 to 420 nm to the reflectivity for illumination in the range of from 315 to 380 nm is from about 1.0 to about 2.

2. The article of claim 1, wherein the region comprises plastic, metal, glass, carbon, or any combination thereof.

3. The article of claim 2, wherein the plastic comprises a thermoplastic.

4. The article of claim 1, wherein the plurality of cells has a spatial density in the range of from 106 cells/cm3 to 1012 cells/cm3.

5. The article of claim 1, wherein the plurality of cells represents from about 5 to about 70 vol % of the region.

6. The article of claim 1, wherein at least 50% of the plurality of cells, by number, are characterized as closed cells.

7. The article of claim 1, wherein at least 20% of the plurality of cells, by number, are characterized as having as aspect ratio of between about 1 and about 5.

8. The article of claim 1, wherein the region further comprises a nucleant, clay, rubber, a TPE particle, or any combination thereof.

9. The article of claim 8, wherein the nucleant comprises talc, silica, siloxane, clay, or any combination thereof.

10. The article of claim 1, wherein the article has a reflectivity of from about 50% to about 99% for illumination in the range of from about 315 nm to about 380 nm.

11. The article of claim 1, wherein the region is substantially free of swirl marks.

12. The article of claim 1, wherein the region comprises $TiO_2$, ZnS, BN, or any combination thereof.

13. The article of claim 1, wherein at least 50% of the plurality of cells have a cross-sectional dimension that is within 20% of the number-average cross-sectional dimension for the plurality of cells.

14. The article of claim 1, wherein the article further comprises an amount of phosphor.

15. The article of claim 14, wherein the phosphor is disposed on a surface of the article that receives illumination.

16. The article according to claim 1, the article further comprising a violet-pumped LED.

17. The article of claim 16, wherein the violet-pumped LED is configured so as to illuminate the region having a cellular structure.

18. The article of claim 16, wherein the region having a cellular structure is characterized as a layer.

19. The article of claim 1, wherein the article is injection-molded.

* * * * *